US010672086B2

(12) United States Patent
Murata et al.

(10) Patent No.: US 10,672,086 B2
(45) Date of Patent: Jun. 2, 2020

(54) INTERACTIVE TEST-SCHEDULE ADJUSTMENT METHOD

(71) Applicant: INTERNATIONAL BUSINESS MACHINES CORPORATION, Armonk, NY (US)

(72) Inventors: Masayuki Murata, Tokyo (JP); Hiroaki Nakamura, Kanagawa-ken (JP); Junya Shimizu, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 630 days.

(21) Appl. No.: 15/033,707

(22) PCT Filed: Sep. 5, 2014

(86) PCT No.: PCT/JP2014/073514
§ 371 (c)(1),
(2) Date: Sep. 20, 2016

(87) PCT Pub. No.: WO2015/064214
PCT Pub. Date: May 7, 2015

(65) Prior Publication Data
US 2017/0004589 A1    Jan. 5, 2017

(30) Foreign Application Priority Data
Nov. 2, 2013    (JP) ................................. 2013-228854

(51) Int. Cl.
*G06Q 50/04*    (2012.01)
*G06Q 10/04*    (2012.01)
(Continued)

(52) U.S. Cl.
CPC ............ *G06Q 50/04* (2013.01); *G06F 17/11* (2013.01); *G06Q 10/04* (2013.01); *G06Q 10/06* (2013.01);
(Continued)

(58) Field of Classification Search
None
See application file for complete search history.

(56) References Cited

U.S. PATENT DOCUMENTS 6,578,005 B1 *    6/2003    Lesaint ................. G06Q 10/06
705/7.14
2003/0065544 A1 *    4/2003    Elzinga ................. G06Q 10/04
705/7.18
(Continued)

FOREIGN PATENT DOCUMENTS

JP    H02240731 A    9/1990
JP    H0415865 A    1/1992
(Continued)

OTHER PUBLICATIONS

Shu-Kai S. Fan, Erwie Zahara, "Continuous Optimization a hybrid simplex search and particle swarm optimization for unconstrained optimization", European Journal of Operational Research, Sep. 2006, vol. 181, pp. 527-548, Section 2.1 (Year: 2006).*
(Continued)

*Primary Examiner* — Patricia H Munson
*Assistant Examiner* — Chesiree A Walton
(74) *Attorney, Agent, or Firm* — David B. Woycechowsky (57) ABSTRACT

A method for interactive test-schedule adjustment is provided. The steps include: displaying a table including the importance and period of each test item; displaying a first optimum schedule obtained from an optimal solution based on values entered by a user into the table, the schedule including a use schedule of each test facilities used for each of the multiple test items; displaying a second optimum schedule obtained from an optimal solution recalculated by mathematical programming after a use schedule of a test item the importance of which is changed on the first optimum schedule is changed; and displaying a third optimum schedule based on neighborhood solutions obtained by a
(Continued)

search method using a history of optimal solutions if no agreement between the users is obtained on the second schedule.

8 Claims, 5 Drawing Sheets

(51) Int. Cl.
    *G06Q 10/06*         (2012.01)
    *G06F 17/11*         (2006.01)
    *G06Q 10/10*         (2012.01)

(52) U.S. Cl.
    CPC .......... *G06Q 10/1097* (2013.01); *Y02P 90/20* (2015.11); *Y02P 90/30* (2015.11)

(56) References Cited

U.S. PATENT DOCUMENTS

| | | | | |
|---|---|---|---|---|
| 2005/0154625 A1* | 7/2005 | Chua | ............... | G06Q 10/06 700/100 |
| 2009/0150209 A1* | 6/2009 | Levine | ............... | G06Q 10/06 705/7.13 |
| 2011/0224816 A1* | 9/2011 | Pereira | ............ | G05B 19/41865 700/100 |
| 2012/0208152 A1* | 8/2012 | Stacy | ............... | G06F 17/5009 434/188 |
| 2012/0315966 A1* | 12/2012 | Spata | ............... | G06F 9/4881 463/1 |

FOREIGN PATENT DOCUMENTS

| | | |
|---|---|---|
| JP | H0683835 A | 3/1994 |
| JP | H10268909 A | 10/1998 |
| JP | 2002197402 A | 7/2002 |
| JP | 2007148635 A | 6/2007 |
| JP | 2013143030 A | 7/2013 |

OTHER PUBLICATIONS

Lixin Tang, Hua Xuan, Jiyin Liu, "A new Lagrangian relaxation algorithm for hybrid flowshop scheduling to minimize total weighted completion time", Computers & Operations Research 33 (2006) 3344-3359, Available online May 2, 2005 (Year: 2005).*

* cited by examiner

SECTOR_1

| TEST ITEM | IMPORTANCE | TEST PERIOD |
|---|---|---|
| A | 20 | 10 |
| B | 40 | 20 |
| C | 40 | 30 |

SCHEDULING

SECTOR_1

| TEST ITEM | MEASUREMENT FUNCTION 1 | MEASUREMENT FUNCTION 2 | MEASUREMENT FUNCTION 3 | MEASUREMENT FUNCTION 4 | MEASUREMENT FUNCTION 5 |
|---|---|---|---|---|---|
| A |  |  |  | 1 |  |
| B |  | 1 |  |  |  |
| C | 1 | 1 | 1 | 1 | 1 |

FIG. 4

SECTOR_2

| TEST ITEM | IMPORTANCE | TEST PERIOD |
|---|---|---|
| D | 10 | 30 |
| E | 55 | 30 |
| F | 35 | 30 |

SCHEDULING

SECTOR_2

| TEST ITEM | MEASUREMENT FUNCTION 1 | MEASUREMENT FUNCTION 6 | MEASUREMENT FUNCTION 3 | MEASUREMENT FUNCTION 4 | MEASUREMENT FUNCTION 5 |
|---|---|---|---|---|---|
| D | 1 |  |  |  | 1 |
| E |  |  | 1 | 1 |  |
| F | 1 | 1 | 1 | 1 | 1 |

FIG. 5

BOTTLENECK ANALYSIS

X MONTH_SCHEDULE_1

| TEST FACILITY | 1 — 10 | 11 — 20 | 21 — 30 |
|---|---|---|---|
| F1 | AAAEEEEEEE | BBBBBBBBBB |  |
| F2 | CCCCCC | CCCCCFFFF | FFFFFFFFFF |
| F3 | DDD |  |  |

FIG. 6

<BOTTLENECK AND PRESENT RANKING>

| BOTTLENECK FACILITY | BOTTLENECK TEST |
|---|---|
| F2 | F |
| F1 | B |
|  | E |

FIG. 7

SECTOR_1

| TEST ITEM | IMPORTANCE | TEST PERIOD |
|---|---|---|
| A | 20 | 10 |
| B | 45 | 20 |
| C | 35 | 30 |

FIG. 8

(BOTTLENECK ANALYSIS)

X MONTH_SCHEDULE_2

| TEST FACILITY | 1—10 | 11—20 | 21—30 |
|---|---|---|---|
| F1 | AAABBBBB | BBBEEEEEE |  |
| F2 | CCCCCC | CCCCCFFFF | FFFFFFFFFF |
| F3 | DDD |  |  |

X MONTH_SCHEDULE_Y

| TEST FACILITY | 1—10 | 11—20 | 21—30 |
|---|---|---|---|
| F1 | AAABBBBB | BBBEEEEEE | |
| F2 | CCCCCC | CCCCC | X |
| F2+ | FFFFF | FFFFFFFFFFF | |
| F3 | DDD | | |

FIG. 11

INTERACTIVE TEST-SCHEDULE ADJUSTMENT METHOD

CROSS-REFERENCE TO RELATED APPLICATION

This application claims priority under 35 U.S.C. § 371 from PCT Application PCT/JP2014/073514, filed on Sep. 5, 2014, which claims priority from Japanese Patent Application No. 2013-228854 filed Nov. 2, 2013. The entire contents of both applications are incorporated herein by reference.

FIELD OF THE INVENTION

The present invention relates to an interactive test-schedule adjustment method, and more specifically to a method of creating/presenting a test schedule plan satisfactory to multiple users.

BACKGROUND

In the manufacturing industry, the optimization of a product manufacturing schedule or a prototype test schedule is important to reduce/suppress the period and costs involved in the production or the period and costs involved in testing. Further, in the manufacture of automobiles, there are many test items such as prototypes. Since each test item is performed in a different test sector (hereinafter also called a "user"), there is a need to optimize (adjust) a test schedule to satisfy requirements from multiple test sectors.

As a tool available for the optimization, for example, there is optimization software using mathematical programming such as CPLEX (registered trademark). Japanese Patent Application Publication no. 2007-148635 discloses a production scheduling method for products using optimization calculation by mathematical programming. Japanese Patent Application Publication no. 2013-143030 discloses an operation schedule preparation method of steel making processes using optimization calculation by mathematical programming after a process having high occupancy of a processing facility is set as a bottleneck process.

However, in conventional scheduling methods including the methods disclosed in Japanese Patent Application Publications no. 2007-148635 and no. 2013-143030, the optimization calculation is mainly used to assign an item to be processed in time to each manufacturing resource, and is not always sufficient to optimize (adjust) a test schedule to satisfy the requirements from multiple test sectors mentioned above. In other words, since it is difficult for the conventional methods to represent an objective function and constraint conditions satisfactory to test sectors, it is difficult to create/present a test schedule plan satisfactory to multiple users.

SUMMARY OF THE INVENTION

Technical Problems

Therefore, it is an object of the present invention to provide an interactive test-schedule adjustment method, and more specifically to provide a method of creating/presenting a test schedule plan satisfactory to multiple users.

Solution to Problems

The present invention provides an interactive test-schedule adjustment method using a computer. The method includes the steps of: displaying a table including the importance and a test period of each of multiple test items for which adjustment of a test schedule is required; displaying a first optimum schedule obtained from an optimal solution calculated by mathematical programming based on values of the importance and the test period entered by a user into the table, the first optimum schedule including a use schedule of each of test facilities used for each of the multiple test items; if at least one or more of the importance values in the table are changed, displaying a second optimum schedule obtained from an optimal solution recalculated by mathematical programming after a use schedule of a test item the importance of which is changed on the first optimum schedule is changed; and if no agreement between the users is obtained even on the second optimum schedule, displaying a third optimum schedule based on neighborhood solutions obtained by a search method using a history of optimal solutions.

According to the method of the present invention, since not only the optimum schedules obtained from optimal solutions calculated by mathematical programming, but also the optimum schedule based on neighborhood solutions obtained by the search method using the history of the optimal solutions are displayed, an agreement between the users is obtained/more easily obtained, so that the use schedule of each of the test facilities used can be optimized/adjusted.

In one aspect of the present invention, the neighborhood solutions by the search method are obtained as discrete solutions of candidates obtained by performing at least one of operations selected from among reflection, expansion, and contraction using a history of three optimal solutions.

In another aspect of the present invention, the step of displaying the second optimum schedule is executed each time the importance value is changed and for each change pattern of a use schedule of a test item the importance of which is changed.

In still another aspect of the present invention, when no agreement between the users is obtained even on the third optimum schedule obtained after execution a predetermined number of times in the step of displaying the third optimum schedule, a step of displaying a fourth optimum schedule based on a Nash equilibrium solution is further included.

In yet another aspect of the present invention, at least one of the steps of displaying the first, second, and third optimum schedules includes a step of highlighting a test item that becomes a bottleneck among the multiple test items in the table displayed in the step of displaying the table.

In still another aspect of the present invention, the step of highlighting a test item that becomes a bottleneck includes a step of displaying, as a bottleneck facility, a test facility used in performing the test item.

In yet another aspect of the present invention, the method further includes a step of displaying a fifth optimum schedule when the bottleneck facility is built more for the multiple test items.

DETAILED DESCRIPTION OF THE INVENTION

Figure 1:
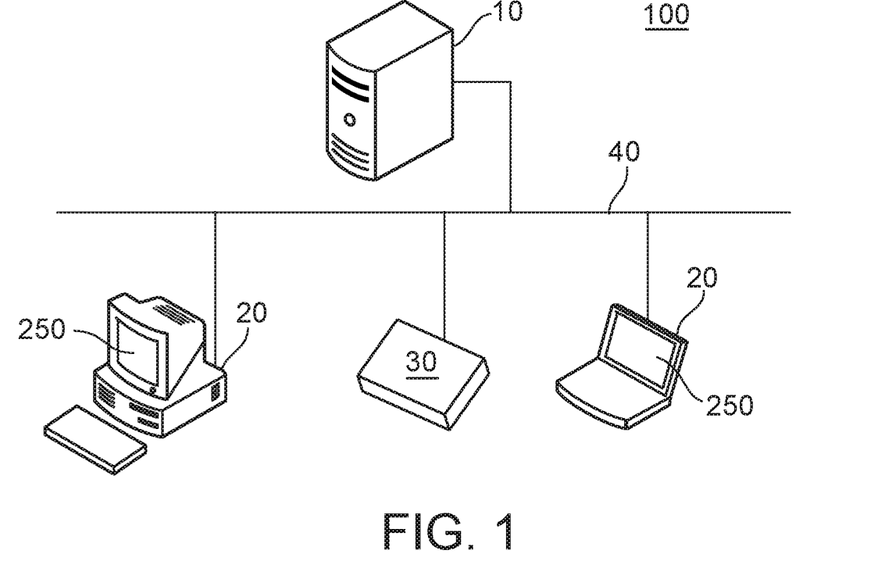
FIG. 1 is a diagram showing a configuration example of a system for carrying out a method of the present invention.

An embodiment of the present invention will be described with reference to the accompanying drawings. FIG. 1 is a diagram showing a configuration example of a system for carrying out a method of the present invention. A system 100 includes a host (server) 10, PCs (terminals) 20, and a network drive 30 connected through a network 40 to be communicable with each other. The network drive 30 includes storage means such as an HDD or a tape drive. Although the host (server) 10 and the network drive 30 are each illustrated as one component and the two PCs (terminals) 20 are illustrated in FIG. 1, this is just an example. It goes without saying that any number (one, or two or more) of machines can be included as each component. Particularly, the PCs (terminals) 20 are installed according to the number of test sectors (hereinafter also called users).

A method of the present invention, the details of which will be described later, is carried out in the configuration of FIG. 1 in such a manner, for example, that the PCs 20 call and execute software downloaded from the server 10 or the network drive 30, or software stored in storage means (HDD or the like) incorporated therein.

Figure 2:
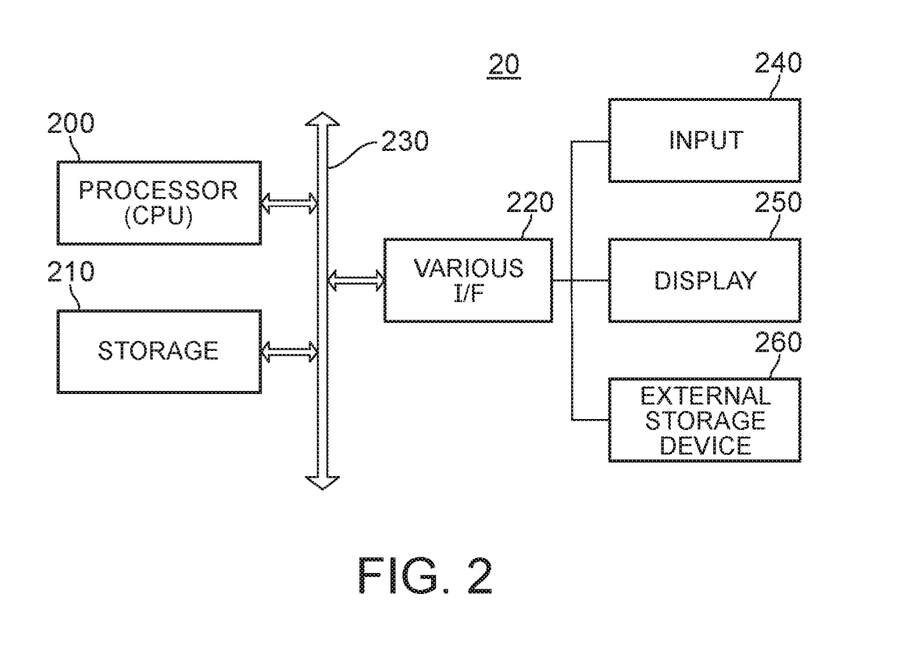
FIG. 2 is a block diagram showing a configuration example of a computer for executing the method of the present invention.

FIG. 2 is a block diagram showing a configuration example of a computer for executing the method of the present invention. FIG. 2 illustrates the configuration example of each PC 20 in FIG. 1. The PC 20 includes a processor (CPU) 200, storage means 210, and various I/F 220, which are connected to each other through a bus 230. The various I/F 220 is used as a generic term that includes an input I/F, an output I/F, an external storage I/F, an external communication I/F, and the like. Each I/F is connected to corresponding means, namely input means 240 such as a keyboard and a mouse, display means 250 such as a CRT or an LCD, or external storage means 260 such as a semiconductor memory through a USB connection or an HDD. The storage means 210 can include semiconductor memories such as a RAM and a ROM, and an HDD. The content of each display step of the method of the present invention is displayed on the display means 250.

Figure 3:
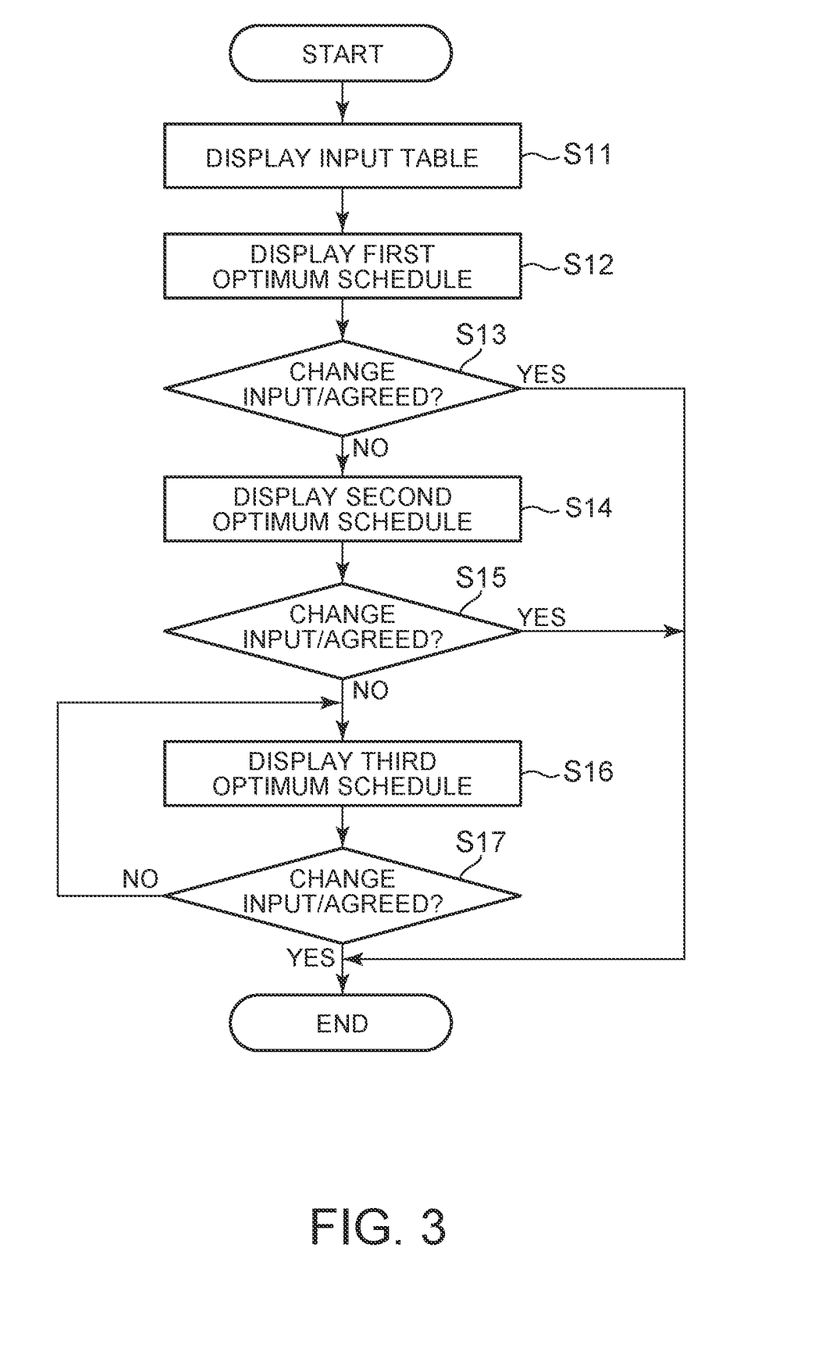
FIG. 3 is a chart showing a flow of the method of the present invention.

FIG. 3 is a chart showing a flow of the method of the present invention. In step S11, an input table on each of multiple items, for which adjustment of a test schedule is required, is displayed. The input table contains the importance and test period of each of test items (each kind of test), and a necessary measurement function. Each of tables including this input table is displayed on the display means 250.

Figure 4:
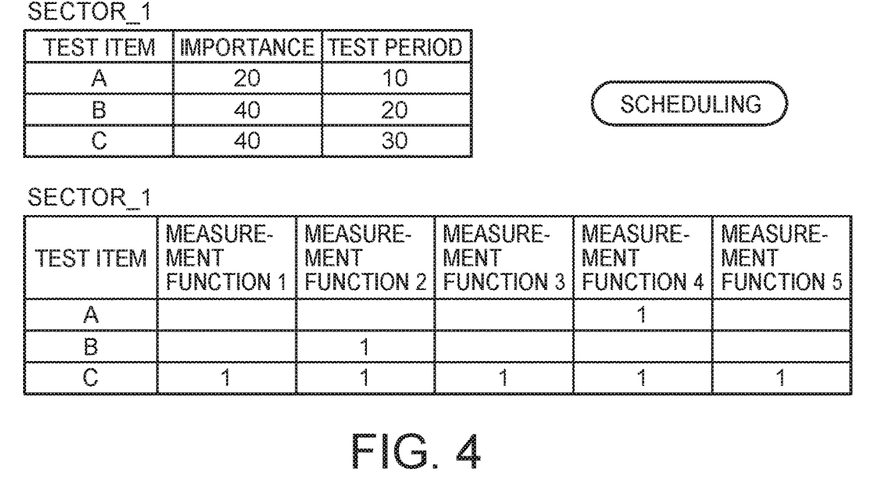
FIG. 4 is a diagram showing an example of input tables of the present invention.
Figure 5:
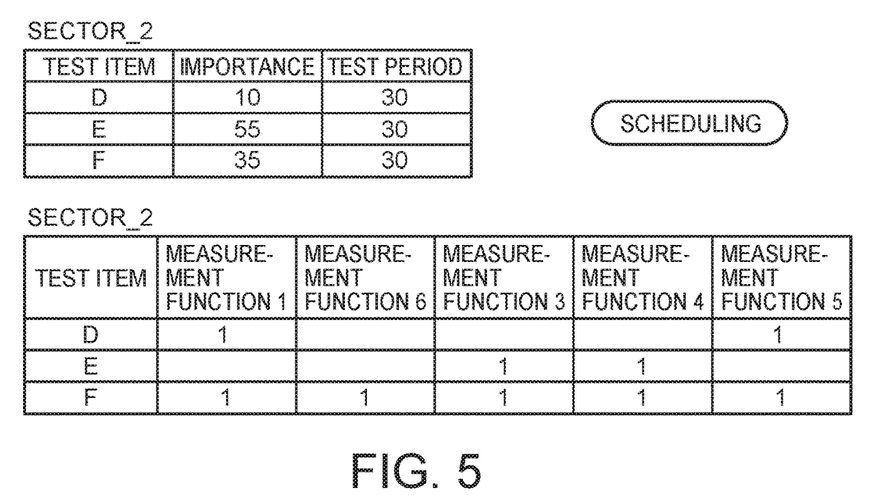
FIG. 5 is a diagram showing another example of input tables of the present invention.

FIG. 4 and FIG. 5 show examples of input tables displayed. FIG. 4 is an example of display to test sector 1, and FIG. 5 shows an example of display to test sector 2. Illustrated in FIG. 4 are an input table indicative of the importance and test period of each of three test items A, B, and C, and an input table indicative of measurement functions 1 to 5. Numeric values in the tables are numeric values already input from sector 1 after each table is displayed. In the table before input, the blank as the initial state or default values (the previous values or the like) in each sector are indicated.

The numeric values of importance are set to come to 100 in total. The larger the numeric value, the higher the importance. The test period means a period (desired time) that can be allocated for each test, and can be set in an arbitrary unit, such as time, day, week, or month, depending on the test target/item. Any other item such as release time can also be added in addition to the test period. Numeric value 1 of the measurement functions 1 to 5 means that the measurement function is required for the test, and the blank means that the measurement function is not required. The display of "scheduling" in FIG. 4 denotes an icon to be clicked to make a schedule adjustment request after data (numeric values) are input into the table.

The meanings of the tables in FIG. 5 are basically the same as those in FIG. 4. In FIG. 5, different points from FIG. 4 are that the test items are D, E, and F, and that there is a measurement function 6 instead of the measurement function 2. Thus, the input tables are displayed for each test sector. The number and contents (kinds) of test items, and the number and contents (kinds) of measurement functions in the tables can be set arbitrarily for each test sector or each test target.

When information (data) on the above input tables is input from each sector, an available test facility and processing time for each test item are automatically derived based on facility information possessed by a supervisor. The supervisor holds (stores), as a table (not shown), the derived available facility and processing time for each test item. Further, the supervisor holds a value (priority) of a priority ratio (100 in total) for each test sector in advance. For example, in the examples of FIG. 4 FIG. 5, test sector 1 is set to 40 and test sector 2 is set to 60, and a schedule is so adjusted that requirements from test sector 2 will be given higher priority than requirements from test sector 1 in displaying (calculating) the schedule to be described later.

Returning to FIG. 3, a first optimum schedule is displayed in step S12 in response to receiving a click (request) on the "scheduling" icon in FIG. 4 and FIG. 5. Here, the first optimum schedule means a first schedule obtained from an optimal solution calculated by mathematical programming for the use schedule of each of test facilities used for each of multiple test items based on values of importance and test period entered by the user into the input table. The optimal solution calculated by mathematical programming can be obtained, for example, as an optimal solution by mixed integer programming. The optimal solution by mixed integer programming can be obtained by determining a use schedule (allocation) of a test facility that satisfies the following formula (1) under predetermined constraint conditions (for example, including the following formulas (2) and (3)):

[Math. 1]

$$\text{minimize} \sum_{j=1}^{n} w_j U_j + \rho \sum_{j=1}^{n} w_j(C_j - d_j) \quad (1)$$

-continued $$U_j = \begin{cases} 1 (\text{if } C_j \geq d_j) \\ 0 (\text{otherwise}) \end{cases} \quad C_j = \sum_{k=1}^{n} \sum_{l=1}^{m} (i_{kl} + p_{jl}) u_{jkl}$$

Constraint Condition 1: (parallel performing disabled)
[Math. 2]

$$\sum_{k=1}^{n} \sum_{l=1}^{m} u_{jkl} = 1 \; \forall \; j = 1 \ldots n \quad (2)$$

Constraint Condition 2: (exclusive use)
[Math. 3]

$$\sum_{j=1}^{n} u_{jkl} \leq 1 \; \forall \; k = 1 \ldots n, \forall \; l = 1 \ldots m \quad (3)$$

In the formulas (1) to (3), design variables and parameters have the following meanings:
<Design Variable>
$u_{jkl}$: 1 when test j is the k-th to be performed in facility I, or otherwise 0.
$U_j$: The presence or absence of performing test j. 1 when test j is not performed, or otherwise 0.
$t_{kl}$: The starting time of the k-th test in facility I.
<Parameter>
$w_j$: The weight of test j (the value of test j).
$p_{jl}$: The time required to process test j in facility I.
$d_j$: The target deadline of test j.

In formula (1), the objective function is set as the quantity of test results within a fixed period to evaluate, as optimum, an allocation that maximizes the quantity. However, since performing the test is set as $U_j$=0, minimize is obtained as in formula (1). The weight $w_j$ of test j is determined by dividing the above-mentioned priority value possessed by the supervisor by an importance value of the test from each sector. Further, an item for giving a penalty to a test that exceeds the test period is added as an arbitrary coefficient ρ to find a combination that finishes the test as quickly as possible.

Figure 6:
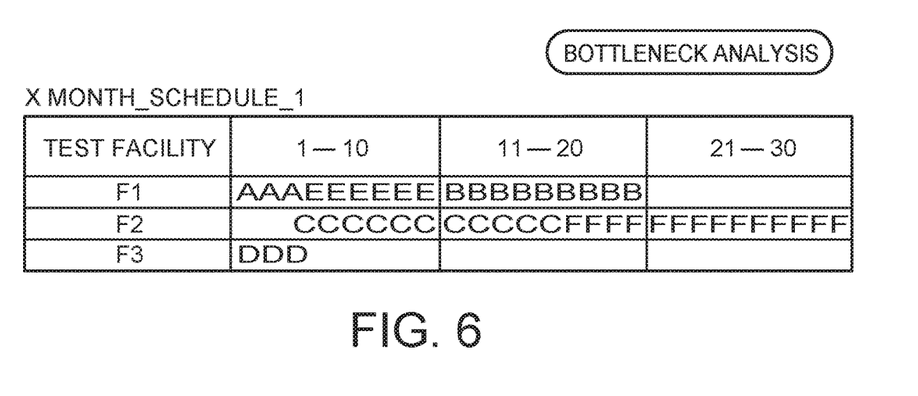
FIG. 6 is a diagram showing a display example of a first optimum schedule of the present invention.

FIG. 6 shows a display example of the first optimum schedule obtained in step S12. FIG. 6 shows use schedules of test facilities F1 to F3 in X month for test items A to E in FIG. 4 and FIG. 5. In FIG. 6, the length of a character string "XXX" indicates the period (days) in which test item X uses/occupies test facility Y. For example, it means that test facility F3 is used for test item D for a period of "DDD" (a few days) at the beginning of the month. Note that the indication in FIG. 6 is just an example, and any indication format for representing a period such as an arrow "⇌" or a straight line "-" can be selected instead of the character string "XXX."

A "bottleneck analysis" icon in FIG. 6 is displayed to be clicked when the user wants bottleneck analysis. Here, the bottleneck analysis means that test items and test facilities that become bottlenecks (critical) in determining an optimum schedule are extracted. In the bottleneck analysis, for example, a test that falls under any of the following (a) to (e) is determined to be a bottleneck test:
(a) A test having a large fluctuation range in upper/lower limit analysis or the like based on normal form of mathematical programming;
(b) A test high in the frequency of facility usage;
(c) A test small in the difference between both sides of an inequality as a constraint condition;
(d) A test having a test item capable of being processed earlier and existing in any other facility; and
(e) A test detected as a combination of (a) to (d).

Then, a facility in which the above test is performed is determined to be a bottleneck facility, and importance values are added up to set higher bottleneck tests in order from the largest value.

Figure 7:
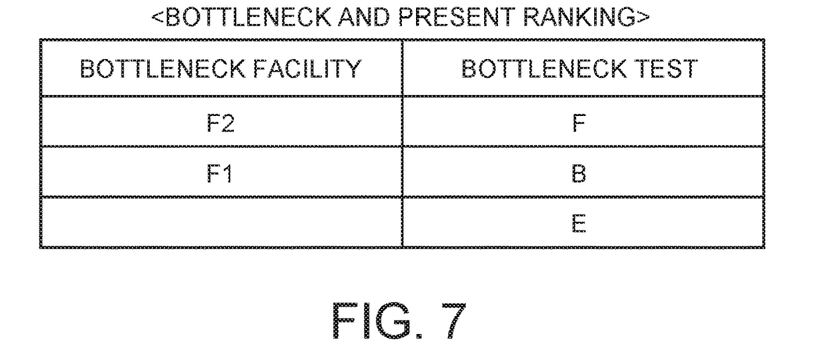
FIG. 7 is a diagram showing a display example of bottleneck information of the present invention.

As a result of the bottleneck analysis, the tests and facilities determined to be bottlenecks are highlighted. For example, the test items are displayed in color or highlighted with blinking or the like in the tables of FIG. 4 and FIG. 5. In the display example of the optimum schedule in FIG. 6, the bottleneck facilities are highlighted in the same manner. Further, for example, in the examples of FIG. 4 to FIG. 6, bottleneck information as shown in FIG. 7 is displayed as supervisor information. In FIG. 7, the bottleneck facilities are F2 and F1 and the bottleneck tests are F, B, and E, and the rankings are best to worst from top to bottom. Then, each sector is informed whether a requested test becomes a bottleneck and of a rough ranking thereof.

Returning to FIG. 3, it is determined in step S13 whether it is agreed on the first optimum schedule. Specifically, for example, the determination is made by determining whether the importance is changed in the input table illustrated in FIG. 4 or FIG. 5. For example, when a numeric value larger than the importance is input, it is determined that the test sector (user) does not satisfy the schedule (facility use schedule) of the test item, i.e., that the test sector is requesting speeding up the schedule.

Figure 8:
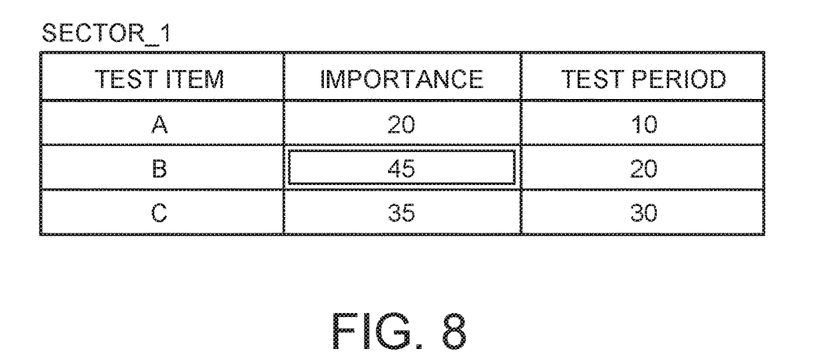
FIG. 8 is a diagram showing an example of change input of importance in the present invention.

An example of change input of importance is shown in FIG. 8. FIG. 8 shows an example where test sector 1 increases the importance of test item B from 40 (FIG. 4) to 45, and conversely, decreases the importance of test item C from 40 to 35. As mentioned above, the numeric values of importance are set to be 100 in total. Therefore, for example, when such a change that the importance of test item B is only increased to 45 is input, an error message can be displayed to urge the user to change a numeric value so that the total will become 100.

When the determination in step S13 is Yes (agreed), scheduling by the method is ended. When this determination is No (importance changed=not agreed), a second optimum schedule is displayed in the following step S14. Here, the second optimum schedule means a second schedule obtained from an optimal solution calculated by mathematical programming for the use schedule of each of test facilities illustrated in FIG. 6 based on the changed value of importance entered by the user into the input table. In other words, rescheduling is performed.

When the case of FIG. 4 to FIG. 6 is taken as an example, the rescheduling in step S14 is performed, for example, in the following procedure: A schedule pattern in which a test period "BB . . . BB" of test item B the importance of which is increased in FIG. 8 is replaced with all test periods ("AAA" and "EE . . . EE") that precede in the facility F1 is prepared. Conversely, if the importance is decreased, all schedule patterns with the test period postponed are prepared. Then, an optimal solution is obtained by mixed integer programming using formula (1) in the same manner as in step S12. Note that schedule patterns that do not satisfy the above-mentioned constraint conditions (formulas (2), (3), and the like) are excluded.

Figure 9:
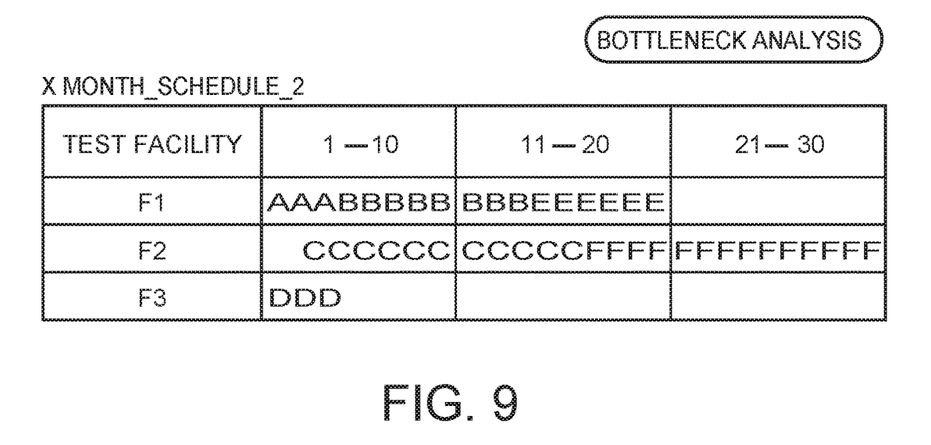
FIG. 9 is a diagram showing a display example of a second optimum schedule of the present invention.

FIG. 9 shows a display example of the second optimum schedule. The content (meaning of each item) of the display example in FIG. 9 is the same as that of the display example in FIG. 6. A point changed from the case of FIG. 6 is that the test period "BB . . . BB" of test item B is made earlier than the test period "EE . . . EE" of test item E on the schedule of test facility F1, reflecting the increase in the importance of test item B. Thus, the schedule of a corresponding test facility is automatically changed and displayed according to a change in importance.

In the following step S15, it is determined whether it is agreed on the second optimum schedule. A specific procedure is the same as that in step S12. When the determination in step S15 is Yes (agreed), scheduling by the method is ended. When this determination is No (importance changed=not agreed), a third optimum schedule is displayed in the following step S16. The third optimum schedule means a schedule with an importance change reflected, like the case of the second optimum schedule in step S14.

Like the first and second optimum schedules, the third optimum schedule can be obtained by the method of obtaining an optimal solution by mixed integer programming. Further, in the present invention, a third optimum schedule based on neighborhood solutions obtained by a search method using a history of optimal solutions can be derived and displayed to respond to a case where no agreement on the schedule obtained from the optimal solution is reached. When no agreement on the optimal solution is reached, since it can be considered that a solution satisfactory to users exists around/near the optimal solution, the third optimum schedule based on the neighborhood solutions can be derived, for example, by the following method.

Figure 10A:
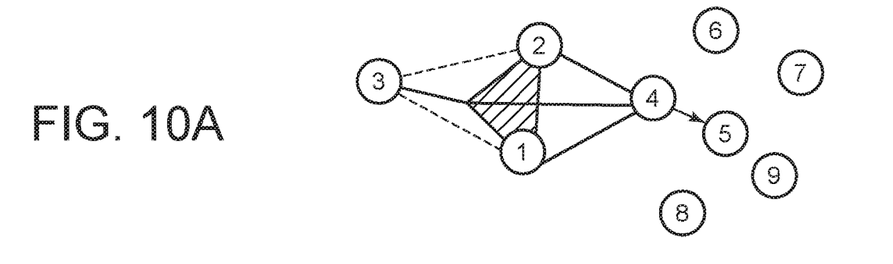
FIG. 10 contains illustrations for describing a procedure for obtaining neighborhood discrete solutions by a search method of the present invention.
Figure 10B:
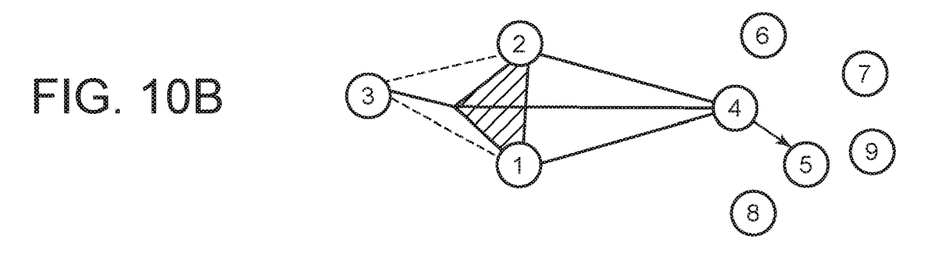
Figure 10C:
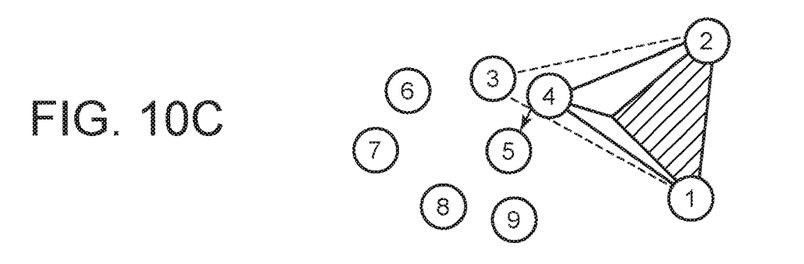

FIG. 10 contains illustrations for describing a procedure for obtaining neighborhood solutions by the search method using the history of optimal solutions, or more precisely, a procedure for obtaining neighborhood discrete solutions. FIGS. 10A, 10B, and 10C are examples of obtaining neighborhood discrete solutions by operations of "reflection," "expansion," "contraction" in this order in the downhill simplex method. In FIG. 10A to FIG. 10C, numbers 1 to 3 are points (positions) indicative of a history of optimal solutions, a point (position) of number 4 is a solution candidate obtained by each operation, and points (positions) of numbers 5 to 9 are discrete solutions in the neighborhood of the solution candidate. The history of optimal solutions 1 to 3 denotes the order of appearance of optimal solutions. Using the solution history of numbers 1 to 3, i.e., setting two points (1 and 2) as a base, the operation of reflection in FIG. 10A, the operation of expansion in FIG. 10B, and the operation of contraction in FIG. 10C are carried out, respectively, to create a new solution candidate (circled number 4). After that, discrete solutions (5 to 9) in the neighborhood of each of the solution candidates are created and displayed in order from the closest point. In other words, the nearest discrete solution (5) is first displayed.

Each of the solution candidates (4) in FIG. 10A to FIG. 10D can be obtained, for example, by solving the following equations (4) to (6).

(a):
[Math. 4]

$$x_{4r} = \bar{x} + \rho(\bar{x} - x_3), \bar{x} = \sum_{i=1}^{3} x_i/3, \rho > 0 \quad (4)$$

(b):
[Math. 5]

$$x_{4e} = \bar{x} + \chi(x_{4r} - \bar{x}), \chi > \rho \quad (5)$$

(c):
[Math. 6]

$$x_{4c} = \bar{x} - \gamma(\bar{x} - x_3), \gamma > 0 \quad (6)$$

Returning to FIG. 3, it is determined in step S17 whether it is agreed on the third optimum schedule. The determination method is the same as that in step S13 and step S15. Specifically, for example, the determination is made by determining whether the importance is changed in the input table illustrated in FIG. 4 or FIG. 5. When the determination in step S17 is Yes (agreed), scheduling by the method is ended. When this determination is No (importance changed=not agreed), the procedure returns to step S16 to repeat displaying of a fourth optimum schedule and beyond until a total agreement is reached.

Figure 11:
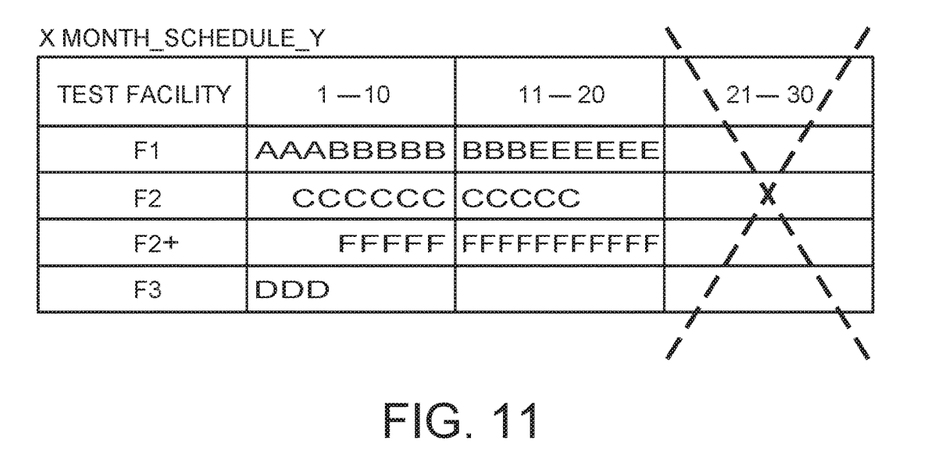
FIG. 11 is a diagram showing a display example of a schedule when a facility is extended in the present invention.

When an agreement on the schedule is reached in the above step, expectations when an investment in (extension of) a bottleneck facility is made can be simulated to further improve test efficiency from the schedule. For example, when facility F2 in FIG. 7 is built more (F2+ is added) on the schedule of FIG. 9, the period (FF . . . FF) of test item F can be allocated to an added device (F2+) as shown in FIG. 11. As a result, the total schedule can be shortened. In other words, a period of 21 to 30 (days) can be made unnecessary as shown in FIG. 11, enabling further improvement in test efficiency.

The embodiment of the present invention has been described with reference to the accompanying drawings. However, the present invention is not limited to the embodiment. The present invention can be carried out in forms to which various improvements, corrections, and modifications are added based on the knowledge of those skilled in the art without departing from the purpose of the present invention.

The invention claimed is:

1. A computer-implemented method for interactive test-schedule adjustment the method comprising: displaying a table on a display, the table including an importance and a test period of a plurality of test items for which adjustment of a test schedule is required, each test item representing an operation in a manufacturing process, each test item corresponding to a respective user of a plurality of users such that the respective user sets the importance, and the test schedule representing manufacturing operations performed in one or more test facilities; generating a first optimum schedule based on a minimized mathematical function that, for each test item of the plurality of test items, weights, based on the importance of a respective test item included in the table, a sum of (i) a first variable representing, at least in part, an amount of time required to perform a respective test item as a function of (a) a start time of each instance of the respective test item at each respective test facility performing the respective test item and (b) a time required to perform the respective test item at the respective test facility and (ii) a second variable representing a target deadline of the respective test item, the first optimum schedule including a use schedule of test facility evaluated using the minimized mathematical function; displaying the first optimum schedule on the display; displaying a second optimum schedule on the display if at least one of the importance values in the table are changed, the second optimum schedule being generated by recalculating the minimized mathematical function based on the changed importance values in the table; displaying a third optimum schedule on the display based on neighborhood solutions obtained by a search method using a history of optimal solutions generated by minimizing the mathematical function in response to changes in the importance values if no agreement between the users on the second optimum schedule; and performing the manufacturing operations corresponding to the plurality of test items.

2. The computer-implemented method according to claim 1, wherein the neighborhood solutions by the search method are obtained as discrete solutions of candidates obtained by performing at least one of operations selected from among reflection, expansion, and contraction based on the history of optimal solutions.

3. The computer-implemented method according to claim 1, wherein the step of displaying the second optimum schedule is executed each time any importance value is changed.

4. The computer-implemented method according to claim 2, wherein the step of displaying the third optimum schedule is executed while changing the discrete solutions of the candidates a predetermined limited number of times until an agreement between the users is obtained.

5. The computer-implemented method according to claim 4, the method further comprising:
    displaying a fourth optimum schedule based on a Nash equilibrium solution, when no agreement between the users is obtained on the third optimum schedule obtained after execution the predetermined limited number of times in the step of displaying the third optimum schedule.

6. The computer-implemented method according to claim 1, wherein at least one of the steps of displaying the first, second, and third optimum schedules includes a step of highlighting a test item that becomes a bottleneck among the plurality of test items in the table displayed in the step of displaying the table.

7. The computer-implemented method according to claim 6, wherein the step of highlighting a test item that becomes a bottleneck includes a step of displaying, as a bottleneck facility, a test facility used in performing the test item.

8. The computer-implemented method according to claim 7, the method further comprising:
    displaying a fifth optimum schedule when the bottleneck facility is extended such that additional test items can be allocated to the bottleneck facility.

* * * * *